June 8, 1965    W. G. COTT    3,188,097

PRESSURE SENSITIVE SEALING DEVICE

Filed May 4, 1963

INVENTOR.
Wendell G. Cott
BY Wayne Lang
AGENT

United States Patent Office 3,188,097
Patented June 8, 1965

3,188,097
PRESSURE SENSITIVE SEALING DEVICE
Wendell G. Cott, Genesee, Pa., assignor to Combustion Engineering, Inc., New York, N.Y., a corporation of Delaware
Filed Mar. 4, 1963, Ser. No. 262,719
2 Claims. (Cl. 277—74)

The present invention relates to a shaft sealing device and particularly to an improved shaft seal adapted to effectively preclude the flow of fluid past a rotary shaft that extends between relatively high and low pressure zones.

Known shaft seals of the general type here defined rely upon mechanical actuating means to bias the sealing members into a suitable sealing relationship. Moreover, shaft sealing arrangements are as a rule suitable only if carefully installed in a particular manner with their several parts exactly co-axial one with another. Such an arrangement leaves little opportunity for lateral adjustment of the shaft during its rotation. Moreover the effectiveness of a mechanically induced sealing force usually decreases with use, it is somewhat more complex to manufacture and more expensive to maintain.

The principal object of this invention is therefore to provide a shaft seal that relies upon an existing differential of fluid pressure to produce a force which maintains the relatively movable sealing members in a sealing relationship. A further object of the invention is to provide a shaft seal that is efficient in operation, yet simple to construct and economical to maintain.

These and other objects of my invention will become more apparent when read in conjunction with the drawing in which.

Figure 1:
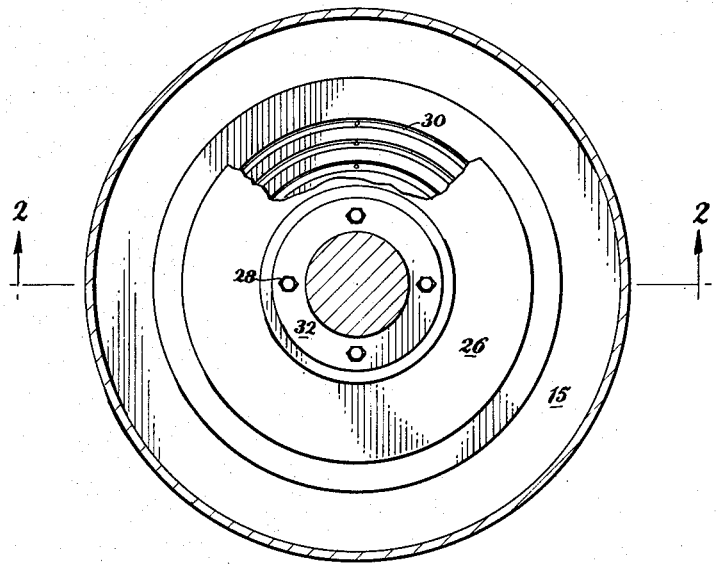
FIGURE 1 represents a top plan view of the seal, partially broken away to show the relationship of abutting parts.
Figure 2:
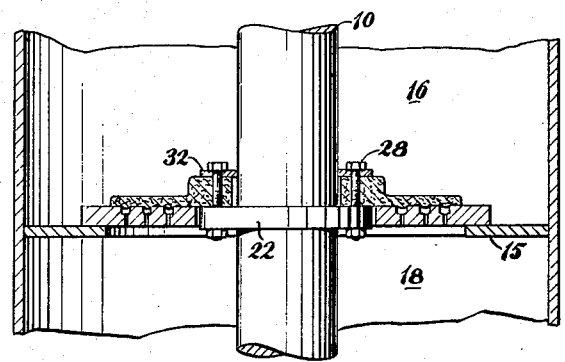
FIGURE 2 is a side elevation in section showing the elements of the shaft seal.
Figure 3:
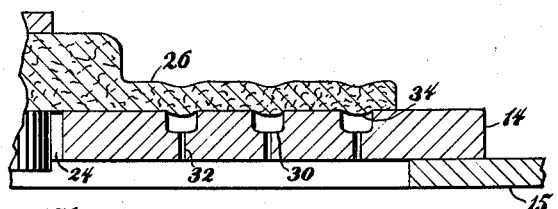
FIGURE 3 is an enlarged view showing the elements of the apparatus in closer detail.

In referring to the drawing a cylindrical shaft 10 is directed through an aperture formed in a seal cover 14 which is carried by a casing 15 that effectively separates a high pressure zone 16 from a low pressure zone 18. The shaft is formed with a circumferential flange 22 axially aligned with the seal cover 14 and having an outside diameter that provides an annular clearance space 24 within the aperture of the seal cover.

An annular sealing member 26 formed of flexible material impervious to the fluids being sealed is secured to the flange 22 by bolts 28 which draw against a retaining ring 32 and the intervening portion of the flexible sealing member.

The flexible sealing member 26 is positioned in the high pressure zone to utilize the pressure of the high pressure fluid acting against its surface area thereby forcing it into a sealing engagement with the confronting face of the seal cover 14.

To enhance the action of the high pressure fluid acting upon the face of the flexible sealing member 26, this invention provides for one or more concentric annular grooves 30 to be formed in the face of the seal cover 14 that confronts the flexible sealing member 26. Each groove is provided with a vent passageway 32 having a port opening to the low pressure zone in order that low pressure fluid may occupy the space within each groove. With maximum available high pressure fluid acting against one side of the flexible sealing member, and minimum low pressure fluid directly opposed thereto in the space of the annular grooves, a near maximum differential of pressure is continuously maintained across the sealing member in a plurality of radially spaced locations.

Inasmuch as the maximum pressure differential of the high and low pressure zones is imposed on axially opposite portions of the flexible sealing member 26, there is a tendency for the material of flexible member 26 to conform to the groove as at 34 and provide a further improved sealing relationship between the fixed and movable members.

While this invention has been described with reference to the embodiment illustrated in the drawing, it is evident that numerous changes may be made without departing from the spirit of the invention, and it is intended that all matter contained in the above description or shown in the accompanying drawing shall be interpreted as illustrative and not in a limiting sense.

I claim:

1. A sealing member for a rotary shaft that extends through a fixed casing between high and low pressure zones comprising in combination, a seal cover secured to said casing and apertured to freely receive the rotary shaft, a flange integral with said rotary shaft lying in axial alignment with said seal cover, a flexible seal member carried by said flange in the high pressure zone to laterally abut said seal cover, annular groove means formed in the face of the seal cover that abuts the flexible seal member, and duct means connecting each groove means with the low pressure zone whereby high and low pressure fluids will have direct access to opposite sides of the flexible seal member to produce a maximum sealing effect thereon.

2. A sealing means for a rotary shaft that extends through a fixed casing between high and low pressure zones comprising in combination; a seal cover secured to said casing and apertured to receive said rotary shaft, flange means extending circumferentially around said shaft in axial alignment with the apertured seal cover, a flexible seal member carried by said flange in the high pressure zone extending radially in laterally abutting relationship with said seal cover, annular groove means concentric with said shaft formed in the face of the seal cover that abuts the flexible seal member, and means venting each groove to the low pressure zone whereby maximum pressure differential is obtained on each portion of the flexible seal that confronts an annular groove means.

References Cited by the Examiner
UNITED STATES PATENTS
2,095,842  10/37  Steenstrup _____ 137—512.15

EDWARD V. BENHAM, Primary Examiner.
SAMUEL ROTHBERG, Examiner.